United States Patent
Henry et al.

(10) Patent No.: US 11,266,053 B2
(45) Date of Patent: Mar. 8, 2022

(54) FLUID NOZZLE SYSTEM AND METHOD FOR DE-PLUGGING GROUND ENGAGING TOOLS OF AN AGRICULTURAL IMPLEMENT

(71) Applicant: CNH Industrial Canada, Ltd., Saskatoon (CA)

(72) Inventors: James W. Henry, Saskatoon (CA); Kevin M. Smith, Narvon, PA (US); Joshua David Harmon, Leola, PA (US)

(73) Assignee: CNH Industrial Canada, Ltd., Saskatoon (CA)

( * ) Notice: Subject to any disclaimer, the term of this patent is extended or adjusted under 35 U.S.C. 154(b) by 75 days.

(21) Appl. No.: 16/676,761

(22) Filed: Nov. 7, 2019

(65) Prior Publication Data

US 2021/0136990 A1 May 13, 2021

(51) Int. Cl.
| | | |
|---|---|---|
| *A01B 71/08* | (2006.01) | |
| *A01B 39/28* | (2006.01) | |
| *A01B 79/00* | (2006.01) | |
| A01B 49/02 | (2006.01) | |

(52) U.S. Cl.
CPC .............. *A01B 39/28* (2013.01); *A01B 71/08* (2013.01); *A01B 79/00* (2013.01); *A01B 49/027* (2013.01)

(58) Field of Classification Search
CPC ....... A01B 39/28; A01B 49/027; A01B 71/08; A01B 79/00
See application file for complete search history.

(56) References Cited

U.S. PATENT DOCUMENTS

| | | | |
|---|---|---|---|
| 4,276,940 A * | 7/1981 | Kirkegaard | .......... A01B 33/027 172/42 |
| 4,538,402 A | 9/1985 | Müeller | |
| 6,497,534 B1 * | 12/2002 | McCoy | .................. A01B 33/16 172/146 |
| 6,800,025 B2 | 10/2004 | Pope et al. | |
| 6,907,718 B2 | 6/2005 | Haverdink | |
| 8,100,603 B2 * | 1/2012 | Sampson | ............... E01C 19/238 404/131 |
| 8,651,927 B1 | 2/2014 | Roberge et al. | |
| 9,615,506 B2 | 4/2017 | Ruppert et al. | |
| 9,924,635 B1 | 3/2018 | Lopez et al. | |
| 2020/0128719 A1 * | 4/2020 | Harmon | ............... A01B 79/005 |
| 2021/0045276 A1 * | 2/2021 | Henry | .................... A01B 71/08 |

FOREIGN PATENT DOCUMENTS

| | | |
|---|---|---|
| JP | H11137064 | 5/1999 |
| JP | H11178406 | 7/1999 |

* cited by examiner

*Primary Examiner* — Gary S Hartmann
(74) *Attorney, Agent, or Firm* — Rebecca L. Henkel; Rickard K. DeMille (57) ABSTRACT

A system for de-plugging ground engaging tools of an agricultural implement includes a ground engaging tool. A fluid nozzle is in fluid communication with a pressurized fluid source such that pressurized fluid from the pressurized fluid source is flowable to the fluid nozzle. The fluid nozzle is oriented towards the ground engaging tool. Thus, pressurized fluid from the fluid nozzle is flowable towards, next to and/or against the ground engaging tool.

22 Claims, 5 Drawing Sheets

FLUID NOZZLE SYSTEM AND METHOD FOR DE-PLUGGING GROUND ENGAGING TOOLS OF AN AGRICULTURAL IMPLEMENT

FIELD OF THE INVENTION

The present disclosure generally relates to agricultural implements and, more particularly, to systems and methods for de-plugging ground engaging tools with one or more fluid flows when material accumulation is detected.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging components configured to rotate relative to the soil as the implement is moved across the field. For example, certain implements include one or more harrow disks, leveling disks, rolling baskets, and/or the like. Such ground engaging component(s) loosen and/or otherwise agitate the soil to prepare the field for subsequent planting operations.

During tillage operations, field materials, such as residue, soil, rocks, and/or the like, may accumulate on ground engaging tools of the implement. Such accumulation of field materials may inhibit operation of the ground engaging tools in a manner that prevents the tools from providing adequate tillage to the field. For instance, material accumulation between adjacent disk blades can result in a plugged condition in which the rotation of the disk blades relative to the ground is slowed or even stopped, thereby hindering the performance of such tools. In such instances, the operator may be required to take a corrective action to remove the plugged or accumulated field materials from the tools. For example, in certain methods, the operator raises the tool out of the ground and manually removes the plugged or accumulated field materials. Manual removal can be a tedious and time consuming process.

Accordingly, an improved system and method for de-plugging ground engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for de-plugging ground engaging tools of an agricultural implement. The system includes a ground engaging tool configured to be supported relative to a frame of an agricultural implement. The system also includes a pressurized fluid source. A fluid nozzle is in fluid communication with the pressurized fluid source such that pressurized fluid from the pressurized fluid source is flowable to the fluid nozzle. The fluid nozzle is oriented towards the ground engaging tool.

In another aspect, the present subject mailer is directed to an agricultural implement that includes a frame. A plurality of ground engaging tools is mounted to the frame. The agricultural implement also includes a pressurized fluid source. A plurality of fluid nozzles is in fluid communication with the pressurized fluid source such that pressurized fluid from the pressurized fluid source is flowable the plurality of fluid nozzles. Each fluid nozzle of the plurality of fluid nozzles is oriented towards a respective one or more of the plurality of ground engaging tools.

In an additional aspect, the present subject matter is directed to a method for de-plugging a ground engaging tool of an agricultural implement is provided. The agricultural implement includes a frame with the ground engaging tool configured to be supported relative to the frame. The method includes receiving, with a computing device, data indicative of material accumulation on the ground engaging tool, determining, with the computing device, when the ground engaging tool is plugged based on the received data, and, in response to the determination that the ground engaging tool is plugged, opening, with the computing device, a valve to flow pressurized fluid from a fluid nozzle towards the ground engaging tool.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for de-plugging ground engaging tools of an agricultural implement. Specifically, in several embodiments, a fluid nozzle is in fluid communication with a pressurized fluid source such that pressurized fluid from the pressurized fluid source is flowable to the fluid nozzle. The fluid nozzle is oriented towards a ground engaging tool such that pressurized fluid from the fluid nozzle may be directed towards, next to, and/or against the ground engaging tool. Fluid from the fluid nozzle may assist with de-plugging the ground engaging tool by pushing or flinging off accumulated field materials. The fluid nozzle may be used as the implement continues to be moved across the field during the performance of an agricultural operation, thereby allowing the tool(s) to be de-plugged without raising the tool(s) out of the ground or stopping the motion of the implement. Alternatively or in addition thereto, the fluid nozzle may be used to be de-plug the tool(s) when the implement is stationary.

Figure 1:
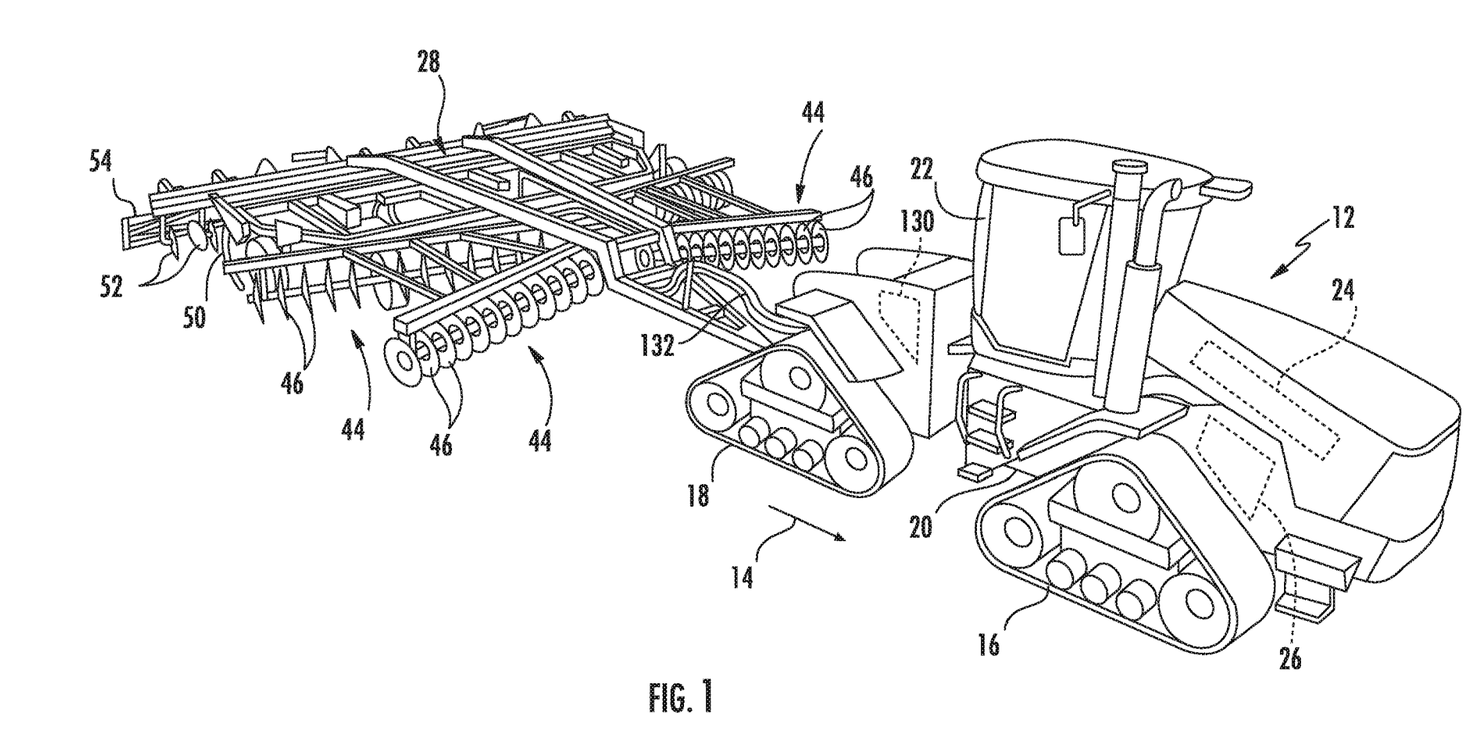
FIG. 1 illustrates a perspective view of one example embodiment of an agricultural implement coupled to a work vehicle in accordance with aspects of the present subject matter.
Figure 2:
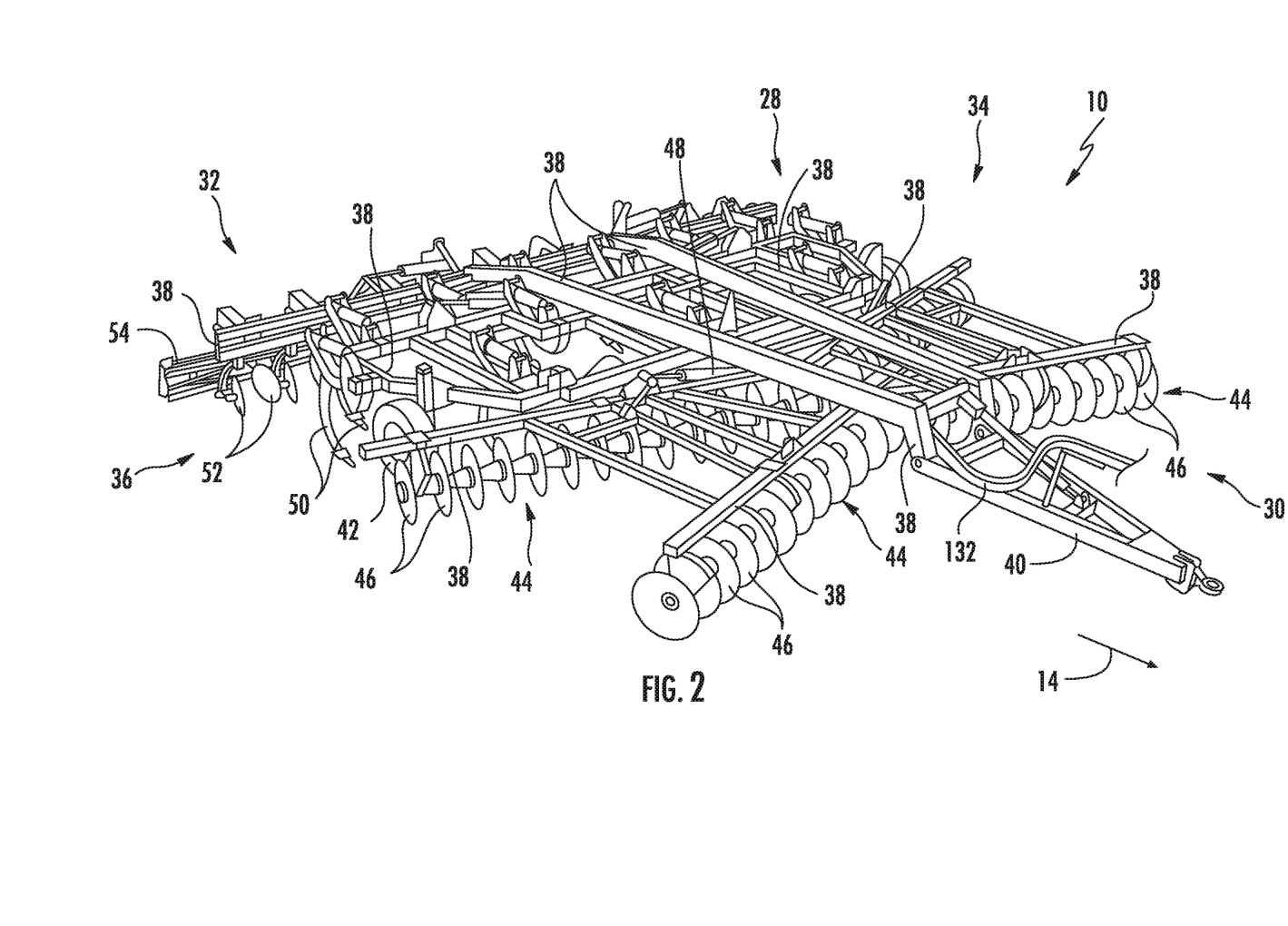
FIG. 2 illustrates another perspective view of the example agricultural implement shown in FIG. 1 in accordance with aspects of the present subject matter.

Referring now to the drawings. FIGS. 1 and 2 illustrate differing perspective views of one example embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blades 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 48 (one is shown), with each actuator 48 being configured to move or otherwise adjust the orientation or position of one of the disk gangs 44 relative to the implement frame 28. For example, a first end of each actuator 48 may be coupled to the frame member 38 on which the corresponding disk gang 44 is supported, while a second end of each actuator 48 may be coupled to a separate portion of the frame 28. The rod of each actuator 48 may be configured to extend and/or retract relative to the corresponding cylinder to adjust the angle of the corresponding disk gang 44 relative to a lateral centerline (not shown) of the frame 28 and/or the penetration depth of the associated disk blades 46. In the illustrated embodiment, each actuator 48 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. However, in other embodiments, any other suitable ground-engaging tools may be coupled to and supported by the implement frame 28, such as a plurality closing disks.

It should be appreciated that the configuration of the implement 10 and the work vehicle 12 described above and shown in FIGS. 1 and 2 is provided only to place the present subject matter in an exemplary field of use. Thus, it should be appreciated that the present subject matter may be readily adaptable to any manner of implement and/or work vehicle configuration.

Figure 3:
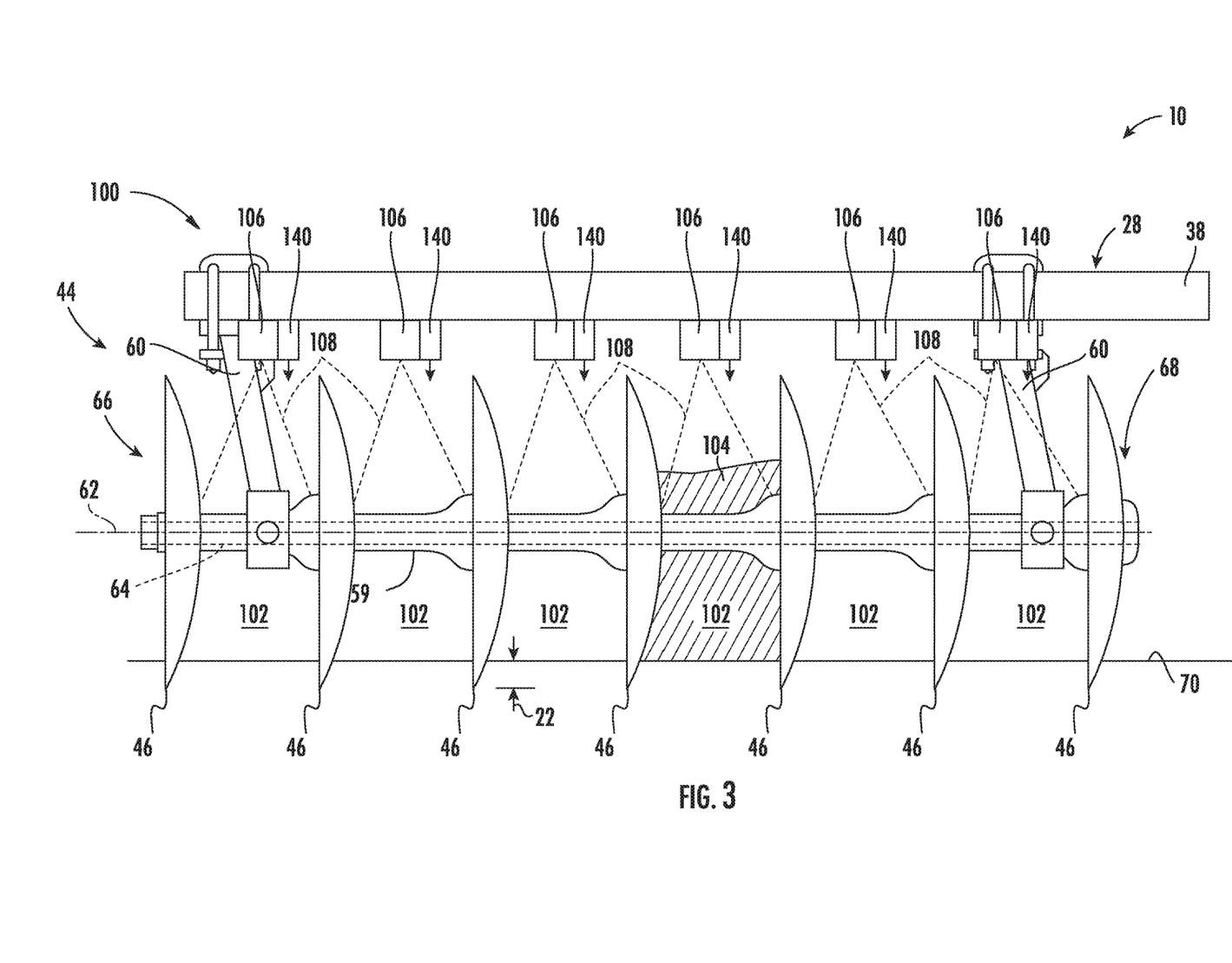
FIG. 3 illustrates a view of one example embodiment of a system for de-plugging ground engaging tools of an agricultural implement in accordance with aspects of the present subject matter, particularly illustrating various system components installed relative to a disk gang of an agricultural implement for de-plugging the disk gang.

Referring now to FIG. 3, a simplified view of one embodiment of a system 100 for de-plugging ground engaging tools of an agricultural implement is illustrated in accordance with aspects of the present subject matter. For purposes of discussion, the system 100 will generally be described herein with reference to one of the disk gangs 44 of the implement 10 described above with reference to FIGS. 1 and 2. However, in other embodiments, the system 100 may be utilized for de-plugging any other suitable ground engaging tools having any other suitable tool configuration, such as shanks 50, leveling blades 52 and/or basket assemblies 54.

As shown in FIG. 3, the disk gang 44 may be configured to be supported relative to a toolbar or frame member 38 of the implement frame 28 via one or more hangers 60 for rotation relative to the ground about a rotational axis 62. Additionally, the disk gang 44 includes a disk gang shaft 64 extending axially along the rotational axis 62 between a first shaft end 66 and a second shaft end 68. As shown, the disk blades 46 of the disk gang 44 are rotatably coupled to the disk gang shaft 64 for rotation on the shaft 64 about the rotational axis 62. Thus, as the implement 10 is moved across a field with the disk gang 44 positioned at its lowered or working position, the disk blades 46 may be configured to penetrate the soil surface (e.g., indicated by line 70 in FIG. 3) of the field and rotate about the rotational axis 62 relative to the soil within the field. For instance, as shown in FIG. 3, when at the working position, the disk blades 46 may penetrate the soil surface 70 to a given penetration depth 72.

Moreover, as shown in FIG. 2, the disk blades 46 are spaced apart from each other axially along the rotational axis 62 such that a material flow zone or gap 102 is defined between each adjacent pair of disk blades 46. In general, each flow gap 102 corresponds to the area or volume through which field materials flow during the operation of the implement 10. Thus, as the implement 10 is moved across the field, field materials (e.g., soil, residue, rocks, and/or the like) may flow through the flow gaps 102 as such field materials are being tilled or otherwise processed by the disk blades 46. In this regard, during normal, non-plugged operation of the disk gang 44, substantially all of the field materials being processed by the disk gang 44 will flow through the flow gaps 102 without accumulating between the adjacent disk blades 46. However, in certain instances, field materials may accumulate within the flow zone(s) 102, thereby leading to a plug condition. For example, when the soil in the field has high moisture content, the soil may stick or adhere to the disk blades 46 such that the soil accumulates with the associated flow zone(s) 102. Moreover, a large chunk of residue or a rock may become lodged between a pair of adjacent disk blades 46 in a manner that inhibits the flow of field materials through the associated flow zone(s) 102, thereby causing additional field materials to accumulate therein. For instance, as shown in FIG. 3, a significant amount of field materials (e.g., as indicated by cross-hatched region 104 in FIG. 3) have accumulated within one of the flow zones 102 such that the disk gang 44 is experiencing a plugged condition. However, it will be understood that disk gang 44 may be plugged by any suitable amount of field material.

In several embodiments, the system 100 may include one or more accumulation sensors 106 configured to detect a parameter (or otherwise provide data) associated with or indicative of material accumulation occurring relative to the disk blades 46. For instance, in one embodiment, the accumulation sensor(s) 106 may be configured to directly detect the presence of material accumulation on one or more of disk blades 46 and/or within one or more of the flow zone or gaps 102 defined between the adjacent disk blades 46. Specifically, as shown in FIG. 3, each accumulation sensor 106 is installed or otherwise positioned on a portion of the implement frame 28 (e.g., on an adjacent frame member 38) such that the accumulation sensor 106 had a field of view 108 directed towards one of the flow zones 102, thereby allowing the accumulation sensor 106 to detect material accumulation between the adjacent blades 46.

In one embodiment, each accumulation sensor 106 may correspond to a vision-based sensor. In such an embodiment, each accumulation sensor 106 may be configured to capture vision data (e.g., images, point cloud data, and/or the like) indicative of field materials present within and/or passing through the associated flow zone(s) 102. It should be appreciated that, when vision-based sensing is utilized, the accumulation sensor(s) 106 may generally correspond to any suitable sensing device(s) configured to capture vision data. As such, in several embodiments, each accumulation sensor 106 may correspond to a suitable camera(s) configured to capture three-dimensional images of the field materials within the associated field of view 108. For instance, in a particular embodiment, each accumulation sensor 106 may correspond to a stereographic camera(s) having two or more lenses, with a separate image sensor for each lens to allow the camera(s) to capture stereographic or three-dimensional images. However, in alternative embodiments, each accumulation sensor 106 may, for example, correspond to a Light Detection and Ranging (LIDAR) sensor(s) configured to capture point cloud data of the field materials within the associated field of view 108.

In another embodiment, each accumulation sensor 106 may be configured as a beam-based sensor(s). As such, each accumulation sensor 106 may be configured to emit one or more output signals across its field of view 108 for reflection off of the field materials located within the associated flow zone(s) 102. The output signals may, in turn, be reflected by the field materials as return signals for receipt by the accumulation sensor 106. In such an embodiment, the time-of-flight (TOF) of the output/return signals may, for example, be utilized to determine the presence of material accumulation within the associated flow zone(s) 102. It should be appreciated that, when beam-based sensing is utilizes, the accumulation sensor(s) 106 may generally correspond to any suitable sensing device(s). For example, each accumulation sensor 106 may correspond to an ultrasonic sensor(s) or a radio detection and ranging sensor (RADAR) sensor(s).

It should be appreciated that, although the illustrated embodiment includes one accumulation sensor 106 associated with each flow gap 102, the system 100 may include any other suitable number of accumulation sensors 106, such as more or less than six sensors 106. Furthermore, in alternative embodiments, each accumulation sensor 106 may be configured to detect field materials within two or more flow gaps 102. Additionally, in a further embodiment, a plurality of accumulation sensors 106 may be configured to detect field materials within each flow gap 102. For example, in such an embodiment, a first accumulation sensor 106 may be configured to detect field materials within a first half of the flow gap 102, while a second accumulation sensor 106 may be configured to detect field materials within a second half of the flow gap 102.

Additionally, it should be appreciated, that as an alternative to directly sensing the field materials within a given flow gap(s) 102, the accumulation sensor(s) 106 may, instead, be configured to indirectly detect the presence of field materials, such as by detecting a parameter that varies with the accumulation of field materials between the disk blades 46. For instance, in one embodiment, the accumulation sensor(s) 106 may correspond to a rotational speed sensor configured to monitor the rotational speed of the disk blades 46. Specifically, a rotational speed sensor 106 may be coupled to the disk gang shaft 64 (e.g., at its second axial end 68) to monitor the rotational speed of the shaft 64 and, thus, the rotational speed of the disk blades 46. As is generally understood, as field materials accumulate between the disk blades 46 and plug the associated flow gap(s) 102, the rotational speed of the disks 46 may be slowed (and even eventually stopped). Thus, by detecting the rotational speed of the disk blades 46, material accumulation between the blades 46 may be inferred when the rotational speed drops a given amount below a predetermined tool speed at which such disk blades 46 would otherwise be expected to rotate given the current ground speed of the implement 10.

With reference to FIGS. 1 and 3, system 100 may also include a pressurized fluid source 130 and plurality of fluid nozzles 140. Nozzles 140 are in fluid communication with pressurized fluid source 130. Thus, pressurized fluid from pressurized fluid source 130 is flowable to fluid nozzles 140, e.g., via a manifold 132 that extends between and connects pressurized fluid source 130 and nozzles 140. Manifold 132 may include pipes, hoses, conduits, etc. for containing pressurized fluid between pressurized fluid source 130 and nozzles 140. While shown with six nozzles 140, system 100 may include any suitable number of nozzles 140, such as more or less than nozzles 140.

Pressurized fluid source 130 may be any suitable mechanism for generating and/or storing pressurized fluid, such as air or water. For example, pressurized fluid source 130 may include one or more of an air tank, a water tank, an air compressor, or a water compressor. Thus, pressurized air source 130 may include an air tank that is charged with and holds pressurized air. In particular, an operator may periodically fill the air tank with pressurized air. Alternatively, the air tank may be coupled to an air compressor that operates to fill the air tank with pressurized air. Similar components may be used to store and/or generate pressurized water. As shown in FIG. 1, pressurized fluid source 130 may be positioned on work vehicle 12. Thus, e.g., pressurized fluid source 130 may be coupled to engine 24 such that the fluid compressor of pressurized fluid source 130 is powered by engine 24. The fluid compressor of pressurized fluid source 130 may have any other suitable power source in alternative example embodiments, e.g., a battery, a solar panel, etc. In alternative example embodiments, pressurized fluid source 130 may be positioned on implement 10.

Nozzles 140 are mounted to implement 10, and each nozzle 140 may be oriented towards a respective ground engaging tool of implement 10. For example, each nozzle 140 may be positioned adjacent a respective one or more of disk blades 46, shanks 50, leveling blades 52 and baskets 54. Thus, a flow, e.g., a stream or fan, of pressurized fluid (shown with arrows in FIG. 3) from each nozzle 140 may flow against, across, and/or next to one or more of disk blades 46, shanks 50, leveling blades 52 and baskets 54. The fluid from nozzles 140 may impact plugs of field material accumulated on the ground engaging tool of implement 10. Thus, fluid from nozzles 140 may advantageously de-plug the ground engaging tools of implement 10, as discussed in greater detail below.

Nozzles 140 may be fan-shaped flow nozzles in certain example embodiments. Thus, e.g., fluid from nozzles 140 may have a fan-shaped pattern in certain example embodiments. The fan-shaped pattern may be particularly advantageous for de-plugging ground engaging tools. In other example embodiments, nozzles 140 may have any other suitable shape to provide a desired flow pattern for fluid from nozzles 140.

Figure 4:
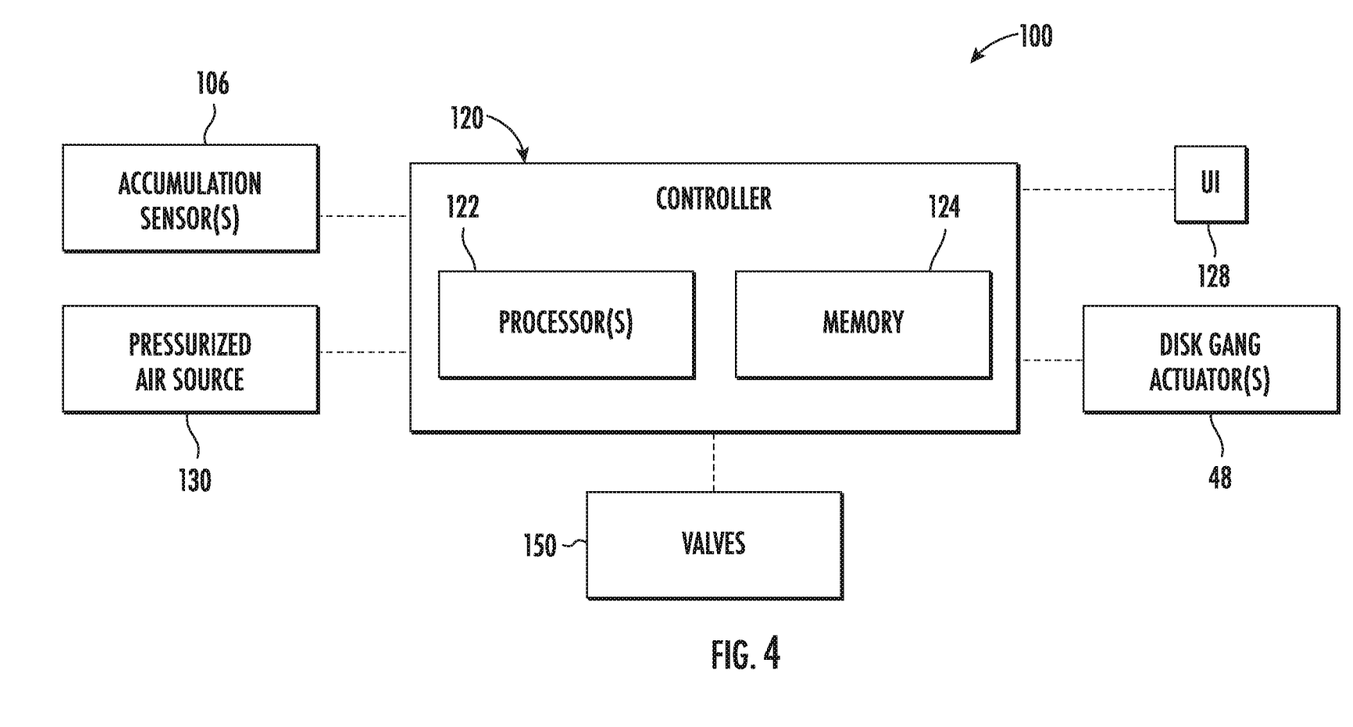
FIG. 4 illustrates a schematic view of one example embodiment of a system for de-plugging ground engaging tools of an agricultural implement in accordance with aspects of the present subject matter.

System 100 may also include one or more valves 150 (FIG. 4). Valve(s) 150 are operable to regulate pressurized fluid flow through nozzles 150. As an example, system 100 may include one (1) valve 150 that is coupled to pressurized fluid source 130 and/or manifold 132. By opening the one valve 150, pressurized fluid from pressurized fluid source 130 may flow to each nozzle 140. As another example, system 100 may include two (2) or more valves 150 that are coupled to manifold 132 and/or nozzles 140. By opening each of the two or more valves 150, pressurized fluid from pressurized fluid source 130 may flow to a respective subset of nozzles 140. As a particular example, system 100 may include an equal number of valves 150 and nozzles 140, and each valve 150 may be coupled to a respective one of nozzles 140. By opening each of the valves 150, pressurized fluid from pressurized fluid source 130 may flow to a respective nozzle 140. Thus, fluid flow through each nozzle 140 may be individually controlled, controlled in subsets, or collectively controlled depending upon the number and arrangement of valves 150 in system 100.

Valve(s) 150 may be solenoid valves. Thus, valve(s) may be electronically controlled in certain example embodiments. As another example, valve(s) 150 may be manual control valves, and a user of system 100 may manually actuate valve(s) 150 to regulate fluid flow through nozzles 140. In other example embodiments, valves(s) 150 may be hydraulically actuated control valves, pneumatically actuated control valves, etc. In certain example embodiments, valve(s) 150 may be opened to various degrees in order to regulate the flow rate of pressurized fluid. Thus, e.g., each valve 150 may be opened to a first configuration such that pressurized fluid from pressurized fluid source 130 flows to one or more respective nozzles 140 at a first flow rate, and each valve 150 may also be opened to a second configuration such that pressurized fluid from pressurized fluid source 130 flows to one or more respective nozzles 140 at a second flow rate that is different from, e.g., greater than, the first flow rate. While described above as adjustable between two open configurations, valve(s) 150 may be opened to three, four, five or more open configurations depending upon the desired number of flow rates in alternative example embodiments.

Referring now to FIG. 4, a schematic view one embodiment of a system 100 for de-plugging ground engaging tools of an agricultural implement is illustrated in accordance with aspects of the present subject matter. In general, the system 100 will be described herein with reference to the implement 10 described above with reference to FIGS. 1 and 2, as well as the disk gang 44 and various system components shown in FIG. 3. However, it should be appreciated by those of ordinary skill in the art that the disclosed system 100 may generally be utilized with agricultural implements having any other suitable implement configuration and/or with ground engaging tools having any other suitable tool configuration.

As shown in FIG. 4, the system 100 may include a controller 120 configured to electronically control the operation of one or more components of the implement 10 and/or the system 100, such as pressurized fluid source 130 and valves 134. In general, the controller 120 may comprise any suitable processor-based device known in the art, such as a computing device or any suitable combination of computing devices. Thus, in several embodiments, the controller 120 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 of the controller 120 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 124 may generally be configured to store suitable computer-readable instructions that, when implemented by the processor(s) 122, configure the controller 120 to perform various computer-implemented functions, such as one or more aspects of the method 200 described below with reference to FIG. 5. In addition, the controller 120 may also include various other suitable components, such as a communications circuit or module, one or more input/output channels, a data/control bus and/or the like.

It should be appreciated that the controller 120 may correspond to an existing controller of the implement 10 or the work vehicle 12 or the controller 120 may correspond to a separate processing device. For instance, in one embodiment, the controller 120 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

As shown in FIG. 4, the controller 120 may be communicatively coupled to the accumulation sensor(s) 106 to allow the controller 120 to receive data from the sensor(s) 106 associated with or indicative of the accumulation of field materials relative to the disk blades 46. As such, the controller 120 may be configured to monitor the presence and/or amount of material accumulation within the flow gaps 102 (FIG. 3) and/or a parameter indicative of such material accumulation to determine when the associated disk gang 44 is experiencing a plugged condition. For instance, when the accumulation sensor(s) 106 is configured to directly detect the presence of material accumulation within the flow gap(s) 102 defined between adjacent disc blades 46, the controller 120 may be configured to compare the amount of material accumulation detected to one or more material accumulation thresholds set for the disk gang 44 and/or associated flow gap(s) 102. In such an embodiment, the threshold(s) may, for example, be associated with a given degree or magnitude of material accumulation between the disk blades 46. Thus, when the amount of material accumulation detected reaches or passes the specific amount(s) associated with the accumulation threshold(s), the controller 102 may determine or infer that the disk gang 44 is experiencing a plugged condition.

When it is determined that the disk gang 44 is experiencing a plugged condition (e.g., based on the sensor data), the controller 120 may be configured to execute a control or corrective action(s) designed to reduce the amount of material accumulation between the plugged disk blades 46. Specifically, in accordance with aspects of the present subject matter, the controller 120 may be configured to actuate valves 150 to facilitate de-plugging of the disk blades 46 with pressurized fluid from pressurized fluid source 130. Valves 150 may be actuated while blades 46 are at their ground-engaging or working positions (i.e., while the blades 46 are penetrating the soil surface) to facilitate de-plugging of the disk blades 46 during the performance of the associated agricultural operation. For example, when plugging is detected as the implement 10 is being traversed across the field to perform an agricultural operation (e.g., a tillage operation), the controller 120 may be configured to open one or more of valve(s) 150 to direct pressurized fluid from nozzles 140 that serves to push or fling out the accumulated field materials as the implement 10 continues to be moved across the field during the performance of the agricultural operation, thereby allowing the disk gang 44 to be de-plugged without raising the disk blades 46 out of the ground or stopping the motion of the implement 10. In alternative example embodiments, controller 120 may be configured to open one or more of valve(s) 150 while blades 46 are lifted from their ground-engaging or working positions.

As noted above, disk gang 44 may be plugged by any suitable amount of field material. As an example, the accumulation threshold may be selected to correspond to a relatively low volume or mass of material accumulation between the disk blades 46. Thus, the fluid nozzles 140 may remove material accumulation between the disk blades 46 prior to a significant volume or mass of material accumulation collecting between the disk blades 46. For instance, in certain example embodiments, the accumulation threshold may be no less than one-tenth of a pound (0.1 lb.) and no greater than ten pounds (10 lbs.). As another example, in certain example embodiments, the accumulation threshold may be no less than five percent (5%) and no greater than fifty percent (50%) of the volume of the flow gap(s) 102 occupied by material accumulation. Such examples are provided for example purposes only to illustrate that disk gang 44 may be de-plugged prior to complete or maximum plugging of disk gang 44. Thus, fluid from nozzles 140 may assist with limiting or preventing complete or maximum plugging of disk gang 44.

In several embodiments, the controller 120 may be configured to open one or more of valve(s) 150 such that the pressurized fluid from pressurized fluid source 130 exits the respective nozzle(s) 140 at a first flow rate when it is determined that the disk gang 44 is experiencing a plugged condition (e.g., based on the sensor data). The first flow rate may be selected to facilitate de-plugging of the disk blades 46 under normal circumstances. For instance, in one embodiment, the valve(s) 150 may be opened so as to flow pressurized fluid from the respective nozzle(s) 140 at the first flow rate for an initial predetermined time period (e.g., 5-10 seconds). As noted above, fluid flow through each nozzle 140 may be individually controlled or controlled in subsets with valve(s) 150, e.g., to provide fluid flow only against plugged portions of disk gang 44.

After directing pressurized fluid from nozzle(s) 140 against the accumulated field materials at the first flow rate, the controller 120 may be configured to assess whether such pressurized fluid flow resulted in de-plugging of the disk gang 44 (e.g., based on updated sensor data received from the accumulation sensor(s) 106). If it is determined that the control action was not effective in de-plugging the disk gang 44, the controller 120 may, for instance, notify the operator that the disk gang 44 is still plugged despite such pressurized fluid flow from nozzle(s) 140. Alternatively, the controller 120 may be configured to open the one or more of valve(s) 150 such that the pressurized fluid from pressurized fluid source 130 exits the respective nozzle(s) 140 at a second flow rate. The second flow rate may be greater than the first flow rate, and the greater volume and/or velocity of pressurized fluid at the second flow rate may be selected to facilitate de-plugging of the disk blades 46 under heavily plugged circumstances to increase the likelihood of de-plugging the disk gang 44. For instance, in one embodiment, the valve(s) 150 may be opened so as to flow pressurized fluid from the respective nozzle(s) 140 at the second flow rate for a second predetermined time period (e.g., 10-20 seconds) in an attempt to again de-plug the disk gang 44.

Referring still to FIG. 4, the system 100 may also include a user interface 128. In general, the user interface 128 may be configured to provide feedback (e.g., notifications associated with tool plugging) to the operator of the implement 10. As such, the user interface 128 may include one or more feedback devices (not shown), such as display screens, speakers, warning lights, and/or the like, which are configured to communicate such feedback. In addition, some embodiments of the user interface 128 may include one or more input devices (not shown), such as touchscreens, keypads, touchpads, knobs, buttons, sliders, switches, mice, microphones, and/or the like, which are configured to receive user inputs from the operator. Such input devices may be used, for example, by the operator to manually instruct the controller 120 to control the operation of the valve(s) 150. In one embodiment, the user interface 128 may be positioned within the cab 22 of the work vehicle 12. However, in alternative embodiments, the user interface 128 may have any suitable configuration and/or be positioned in any other suitable location.

In one embodiment, the controller 120 may be configured to instruct the user interface 128 to provide a notification to the operator (e.g., by causing a visual or audible notification or indicator to be presented to the operator) that provides an indication that field materials have accumulated between adjacent disk blades 46 and/or that provides an indication of the effectiveness (or lack thereof) of attempts to de-plug the disk gang 44 (e.g., with fluid from nozzles 150). In response to such notifications, the operator may, if desired, choose to initiate any suitable corrective action he/she believes is necessary to address any remaining plugging issues.

It should also be appreciated that, in addition to flowing fluid from nozzles 150 and/or transmitting notifications to the operator (or as an alternative thereto), the controller 120 may be configured to automatically execute any other suitable control or corrective actions, such as by automatically adjusting one or more operating parameters of the implement 10. For instance, as shown in FIG. 4, the controller 120 may be communicatively coupled to the disk gang actuator(s) 48 of the implement 10 to allow control signals to be transmitted from the controller 120 instructing the actuator(s) 48 to adjust the angle of the disk gang(s) 44 relative to the lateral centerline of the implement frame 28 and/or the penetration depth of the associated disk blade(s) 46. In addition, the controller 120 may be configured to automatically adjust the ground speed at which the work vehicle 12 is towing the implement 10 across the field.

In certain example embodiments, e.g., when pressurized fluid source 130 includes a fluid compressor, the controller 120 may also be configured to operate a motor of pressurized fluid source 130 to provide a supply of pressurized fluid.

Figure 5:
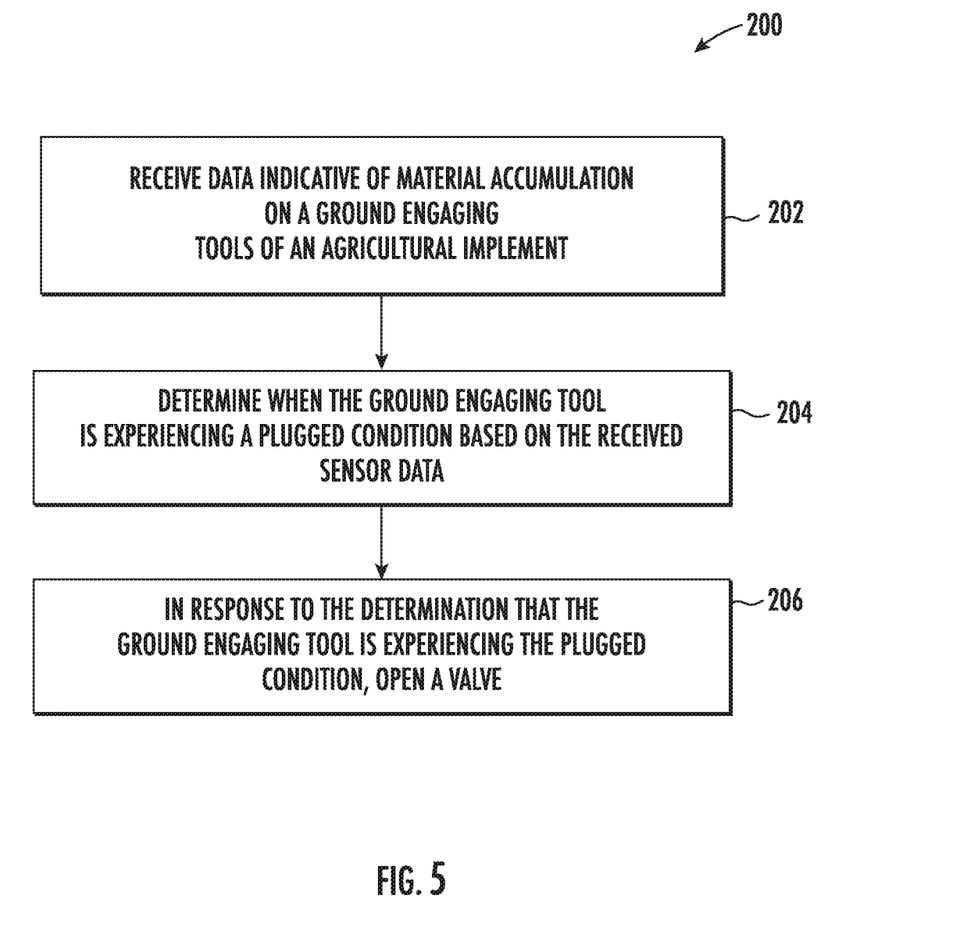
FIG. 5 illustrates a flow diagram of one example embodiment of a method for de-plugging ground engaging tools of an agricultural implement in accordance with aspects of the present subject matter.

Referring now to FIG. 5, a flow diagram of one embodiment of a method 200 for de-plugging ground engaging tools of an agricultural implement is illustrated in accordance with aspects of the present subject matter. In general, the method 200 will be described herein with reference to the agricultural implement 10, the disk gang 44, and the system 100 described above with reference to FIGS. 1 through 4. However, it should be appreciated by those of ordinary skill in the art that the disclosed method 200 may generally be executed with any agricultural implement having any suitable implement configuration, any set of ground engaging tools having any suitable tool configuration, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving data indicative of material accumulation on a ground engaging tool of an agricultural implement. For instance, as described above, the controller 120 may be communicatively coupled to one or more accumulation sensors 106 configured to provide data associated with or indicative of material accumulation on a ground engaging tool, such as within the flow gaps 102 defined between adjacent blade disks 46 of the disk gang 44 shown in FIG. 3.

Additionally, at (204), the method 200 may include determining when the ground engaging tool is experiencing a plugged condition based on the received sensor data. For instance, as described above, the controller 120 may be configured to analyze the data received from the accumulation sensor(s) 106 to determine or estimate when the disk gang 44 is experiencing a plugged condition. Specifically, in one embodiment, the controller 120 may be configured to compare the amount of material accumulation detected within a flow gap 102 defined between adjacent disk blades 46 to a predetermined accumulation threshold(s) to estimate or infer when the associated disk gang 44 is plugged.

Moreover, as shown in FIG. 5, at (206), in response to the determination that the ground engaging tool is experiencing the plugged condition, the method 200 may include opening a valve to flow pressurized fluid towards the ground engaging tool. Specifically, as described above, the controller 120 may be configured to open one or more valves 150 to flow pressurized fluid from nozzle(s) 140 oriented towards the disk blades 46. The disk blades 46 may be maintained at their lowered or working position (i.e., while the blades 46 are penetrating the soil surface) or may be raised when the valve(s) 150 are opened at (206).

It is to be understood that the steps of the method 200 are performed by the controller 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 120 described herein, such as the method 200, is implemented in software code or instructions which are tangibly stored on a tangible computer readable medium. The controller 120 loads the software code or instructions via a direct interface with the computer readable medium or via a wired and/or wireless network. Upon loading and executing such software code or instructions by the controller 120, the controller 120 may perform any of the functionality of the controller 120 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for de-plugging ground engaging tools of an agricultural implement, comprising:
   a ground engaging tool configured to be supported relative to a frame of an agricultural implement;
   a pressurized fluid source;
   a fluid nozzle in fluid communication with the pressurized fluid source such that pressurized fluid from the pressurized fluid source is flowable to the fluid nozzle, the fluid nozzle oriented towards the ground engaging tool;
   a sensor configured to capture data indicative of material accumulation relative to the ground engaging tool;
   a valve operable to regulate pressurized fluid flow through the fluid nozzle; and
   a controller communicatively coupled to the sensor and the valve, the controller configured to determine when the ground engaging tool is plugged based on the data received from the sensor, the controller being further configured to open the valve such that the pressurized fluid from the pressurized fluid source flows to the fluid nozzle in response to the determination that the ground engaging tool is plugged.

2. The system of claim 1, wherein the controller is configured to open the valve such that the pressurized fluid from the pressurized fluid source exits the fluid nozzle at a first flow rate in response to the determination that the ground engaging tool is plugged.

3. The system of claim 2, wherein the controller is configured to determine when the ground engaging tool remains plugged based on the data received from the sensor after opening the valve, the controller being further configured to adjust the valve such that the pressurized fluid from the pressurized fluid source exits the fluid nozzle at a second flow rate in response to the determination that the ground engaging tool remains plugged, the second flow rate being greater than the first flow rate.

4. The system of claim 1, wherein the controller is configured to determine when the ground engaging tool is de-plugged based on the data received from the sensor after opening the valve, the controller further configured to close the valve in response to the determination that the ground engaging tool is de-plugged.

5. The system of claim 1, wherein the valve is a solenoid valve.

6. The system of claim 1, further comprising a manual control valve operable to regulate pressurized fluid flow through the fluid nozzle.

7. The system of claim 1, wherein the pressurized fluid source comprises one or more of a fluid tank and a fluid compressor.

8. The system of claim 1, wherein the fluid nozzle is a fan-shaped flow nozzle.

9. The system of claim 1, wherein the ground engaging tool comprises one or more of a disk blade, a shank, a leveling blade, and a rolling basket.

10. The system of claim 1, wherein the fluid nozzle is oriented towards the ground engaging tool such that the fluid nozzle is configured to direct pressurized fluid at least one of towards, adjacent to, or against the ground engaging tool.

11. An agricultural implement, comprising:
    a frame;
    a plurality of ground engaging tools mounted to the frame;
    a pressurized fluid source;
    a plurality of fluid nozzles in fluid communication with the pressurized fluid source such that pressurized fluid from the pressurized fluid source is flowable to the plurality of fluid nozzles, each fluid nozzle of the plurality of fluid nozzles oriented towards a respective one or more of the plurality of ground engaging tools;
    a sensor configured to capture data indicative of material accumulation relative to at least one of the plurality of ground engaging tools;
    a valve operable to regulate pressurized fluid flow through one or more of the plurality of fluid nozzles; and
    a controller communicatively coupled to the sensor and the valve, the controller configured to determine when one or more of the plurality of ground engaging tools is plugged based on the data received from the sensor, the controller being further configured to open the valve such that the pressurized fluid from the pressurized fluid source flows to the one or more of the plurality of fluid nozzles in response to the determination that the one or more of the plurality of ground engaging tools is plugged.

12. The system of claim 11, wherein the controller is configured to open the valve such that the pressurized fluid from the pressurized fluid source exits the one or more of the plurality of fluid nozzles at a first flow rate in response to the determination that the one or more of the plurality of ground engaging tools is plugged.

13. The system of claim 12, wherein the controller is configured to determine when the one or more of the plurality of ground engaging tools remains plugged based on the data received from the sensor after opening the valve, the controller being further configured to adjust the valve such that the pressurized fluid from the pressurized fluid source exits the one or more of the plurality of fluid nozzles at a second flow rate in response to the determination that the one or more of the plurality of ground engaging tools remains plugged, the second flow rate being greater than the first flow rate.

14. The system of claim 11, wherein the controller is configured to determine when the one or more of the plurality of ground engaging tools is de-plugged based on the data received from the sensor after opening the valve, the controller further configured to close the valve in response to the determination that the one or more of the plurality of ground engaging tools is de-plugged.

15. The agricultural implement of claim 11, wherein each fluid nozzle of the plurality of fluid nozzles is oriented towards the respective one or more of the plurality of ground engaging tools such that the fluid nozzle is configured to direct pressurized fluid at least one of towards, adjacent to, or against the one or more of the plurality of ground engaging tools.

16. The agricultural implement of claim 11, wherein the plurality of ground engaging tools comprises a plurality of disk blades spaced apart from one another such that a material flow gap is defined between adjacent pairs of the disk blades of the plurality of disk blades, wherein each fluid nozzle of the plurality of fluid nozzles is configured to direct pressurized fluid towards the material flow gap defined between a respective adjacent pair of disk blades of the adjacent pairs of disk blades.

17. An agricultural implement, comprising:
a frame;
a plurality of ground engaging tools coupled to and supported by the frame;
a plurality of fluid nozzles coupled to and supported by the frame, the plurality of nozzles being spaced apart from one another relative to the frame such that each fluid nozzle of the plurality of fluid nozzles is oriented towards a respective one or more of the plurality of ground engaging tools, the plurality of nozzles being in fluid communication with a pressurized fluid source such that pressurized fluid from the pressurized fluid source is flowable to the plurality of fluid nozzles;
a sensor configured to capture data indicative of material accumulation relative to at least one of the plurality of ground engaging tools; and
a controller communicatively coupled to the sensor, the controller configured to monitor material accumulation relative to the at least one of the plurality of ground engaging tools based on the data received from the sensor, the controller being further configured to regulate a flow of the pressurized fluid through one or more of the plurality of fluid nozzles based on the monitored material accumulation relative to the at least one of the plurality of ground engaging tools.

18. The agricultural implement of claim 17, further comprising a valve operable to regulate the flow of the pressurized fluid through the one or more of the plurality of fluid nozzles.

19. The agricultural implement of claim 18, wherein the controller is configured to automatically open and close the valve to regulate the flow of the pressurized fluid through the one or more of the plurality of fluid nozzles.

20. The agricultural implement of claim 17, wherein the controller is configured to regulate the flow of the pressurized fluid through the one or more of the plurality of fluid nozzles such that, the pressurized fluid is directed through the one or more of the plurality of fluid nozzles when an amount of material accumulation relative to the at least one of the plurality of ground engaging tools exceeds an associated accumulation threshold.

21. The agricultural implement of claim 17, wherein the plurality of ground engaging tools comprises a plurality of disk blades spaced apart from one another such that a material flow gap is defined between adjacent pairs of the disk blades of the plurality of disk blades, wherein each fluid nozzle of the plurality of fluid nozzles is configured to direct pressurized fluid towards the material flow gap defined between a respective adjacent pair of disk blades of the adjacent pairs of disk blades.

22. The agricultural implement of claim 17, wherein each fluid nozzle of the plurality of fluid nozzles is oriented towards the respective one or more of the plurality of ground engaging tools such that the fluid nozzle is configured to direct pressurized fluid at least one of towards, adjacent to, or against the one or more of the plurality of ground engaging tools.

* * * * *